(12) United States Patent
Martin et al.

(10) Patent No.: US 7,848,505 B2
(45) Date of Patent: Dec. 7, 2010

(54) SECURITY SYSTEM AND METHOD FOR BLOCKING AN INCOMING TELEPHONE CALL, AND A SECURITY SYSTEM WITH A TELEPHONE DO NOT DISTURB FEATURE

(75) Inventors: Christopher D. Martin, Plainview, NY (US); Narine Boodoosingh, Ozone Park, NY (US)

(73) Assignee: Honeywell International Inc., Morristown, NJ (US)

( * ) Notice: Subject to any disclaimer, the term of this patent is extended or adjusted under 35 U.S.C. 154(b) by 1081 days.

(21) Appl. No.: 11/371,398

(22) Filed: Mar. 9, 2006

(65) Prior Publication Data

US 2007/0211877 A1    Sep. 13, 2007

(51) Int. Cl.
*H04M 3/42* (2006.01)

(52) U.S. Cl. .................. 379/210.02; 379/44; 379/48

(58) Field of Classification Search ............ 379/210.02, 379/44, 48
See application file for complete search history.

(56) References Cited

U.S. PATENT DOCUMENTS 4,390,750 A    6/1983  Bartelink
6,370,233 B1   4/2002  Bennett, III et al.
6,456,706 B1*  9/2002  Blood et al. ................. 379/188
2001/0050976 A1  12/2001  Simon et al.
2002/0054601 A1   5/2002  Barraclough et al.

FOREIGN PATENT DOCUMENTS

DE    196 40 483        4/1998
EP    0 863 653 A2      9/1998
GB    2 324 675        10/1998
WO    WO 01/69564       9/2001

* cited by examiner

*Primary Examiner*—Alexander Jamal
(74) *Attorney, Agent, or Firm*—Husch Blackwell Welsh Katz

(57) ABSTRACT

A method and system for blocking an incoming telephone call based upon at least one predetermined criterion. The system includes a security device having a user device for imputting a first control signal to block the incoming telephone call, and for inputting a second control signal for controlling at least one feature of the security system, at least one sensor for detecting an emergency event within a protected area. The sensor generates an alarm signal. The system further includes a control section for processing the first and second control signals. The control section generates a control signal based upon the first control signal. Based upon this control signal, a line seizure means opens or closes a connection between an incoming telephone line and a telephone device. The security system has continuous access to the incoming telephone line, even though the line can be isolated from the telephone device.

25 Claims, 9 Drawing Sheets

SECURITY SYSTEM AND METHOD FOR BLOCKING AN INCOMING TELEPHONE CALL, AND A SECURITY SYSTEM WITH A TELEPHONE DO NOT DISTURB FEATURE

BACKGROUND OF THE INVENTION

1. Field of Invention

The invention relates generally to a security device, and, more particularly, to a method and a system for selectively blocking an incoming telephone call based upon at least one predefined criterion, using the security device.

2. Description of Related Art

Telephone devices are an integral part of today's residential and commercial society, allowing for worldwide communication. When a telephone call is incoming, the telephone device typically will indicate the incoming call using an audible tone. However, there are situations where it is desirable not to be disturbed or situations where a called party does not want to receive a call from a specific person or group of persons.

There are several methods available for monitoring or controlling the flow of incoming calls. First, the telephone device can be turned off, preventing any incoming calls. However, any high priority calls or emergency calls will also be prevented. Additionally, the telephone device is not ready for communication. Second, the incoming call can be screened using a caller ID device that is attached to the telephone device. The caller ID device is a feature wherein a telephone number is associated with data to provide information to the called party regarding the calling party. Caller ID information is typically provided between the first ring signal and the second ring signal. However, the use of an external or internal caller ID device as a screening device still requires the phone device to produce an audible tone or ringing sound and requires the user to walk to the phone to determine whether or not to take the call. Therefore, the user is still disturbed.

A third method requires the user to provide a telephone company with a list of names and/or numbers from which the user does not wish to receive calls or which the user wishes to block. Any incoming call from a person on the list will be blocked by the telephone company.

However, the user must affirmatively provide the telephone company with an updated call block list, and update the list regularly. Additionally, the user will still be disturbed during certain times of the day when they do not want to receive a telephone call.

Accordingly, there is still a need for a homeowner or business user to be able to block or screen a call automatically without having to walk to a phone to determine whether or not to answer a call. Additionally, there is a need to block the call such that the telephone device does not ring or generate an audible tone. Further, there is a need for a user to schedule or set a period of time that all calls can be blocked, i.e., a "do not disturb period."

BRIEF SUMMARY OF THE INVENTION

Accordingly, disclosed is a security system that can be programmed or configured to selectively block an incoming telephone call. The security system comprises a user device for inputting a first control signal to block an incoming telephone call, and for inputting a second control signal for controlling at least one feature of the security system, and at least one sensor for detecting an emergency event within a protected area. The at least one sensor is operable to generate an alarm signal. The security system further includes a control section for receiving the first and second control signals and for processing the first and second control signals. The control section also receives the alarm signal from the at least one sensor. The control section generates a telephone line control signal based upon the first control signal. The security system also includes a line seizure means for opening or closing a connection between an incoming telephone line from a telephone company and a telephone device based upon the telephone line control signal received from the control section.

The security system maintains access to the incoming telephone line, even when the incoming telephone line is isolated or disconnected from the telephone device, to allow for an emergency call to be placed.

The line seizure means can be one or more double-pole, double throw relays. Each relay will have two positions, a first position that corresponds to an open connection to said telephone device, and a second position that corresponds to a closed connection to said telephone device.

By switching the relay, the security device can prevent the telephone device from ringing and disturbing a user. The user can program the security to selectively block calls based upon at least one blocking criterion. The blocking criterion can be a predefined period of time, a scheduled period of time, the caller identification, or the security system status.

Additionally, the blocking criterion can be all call, i.e., a do not disturb mode. If the criterion is a specific time of period, the line seizure means will open the connection from the incoming telephone line to the telephone device during the specific period of time.

The security system can be programmed to block a call immediately via a do not disturb mode or a call in the future. For the do not disturb mode, the user can set a specific sleep period for blocking all incoming calls. Alternatively, a default period can be used.

The user can program the security system to block the incoming call using a user device. The user device can be a user interface device or a user operated transmitter. The user-operated transmitter can be any type of wireless remote control device.

The security device further includes a memory section for storing all user programmed instructions. This memory section is used for storing a preprogrammed list of caller identifications which is used to determine whether to block an incoming telephone call, a programmed blocking schedule or the assigned security system status for blocking all incoming calls.

The control section includes a comparison means and a caller identification means. The caller identification means acquires the caller identification corresponding to a calling party, when an incoming telephone call is received. This caller identification information is compared within the preprogrammed list of caller identifications stored in memory using a comparison means. If the caller identification matches a caller identification from the preprogrammed list, control section causes the line seizure means to open the connection from the incoming telephone line to the telephone device temporarily.

Once the connection is open, the security system can do nothing, disconnect the call or play an outgoing message. The security system further includes a recording means for recording an outgoing message to be played back when an incoming call is blocked and a reproducing means for playing message the outgoing message, when the incoming call is blocked. The outgoing message is stored in memory.

The telephone device can be a separate standalone telephone. Alternatively, the telephone device can be integrated into the security system.

Also disclosed is a corresponding method for blocking all incoming calls during a do not disturb period or selectively blocking calling in the future. Additionally, a method of programming the security system to selectively block incoming calls is disclosed.

DETAILED DESCRIPTION OF THE INVENTION

Figure 1A:
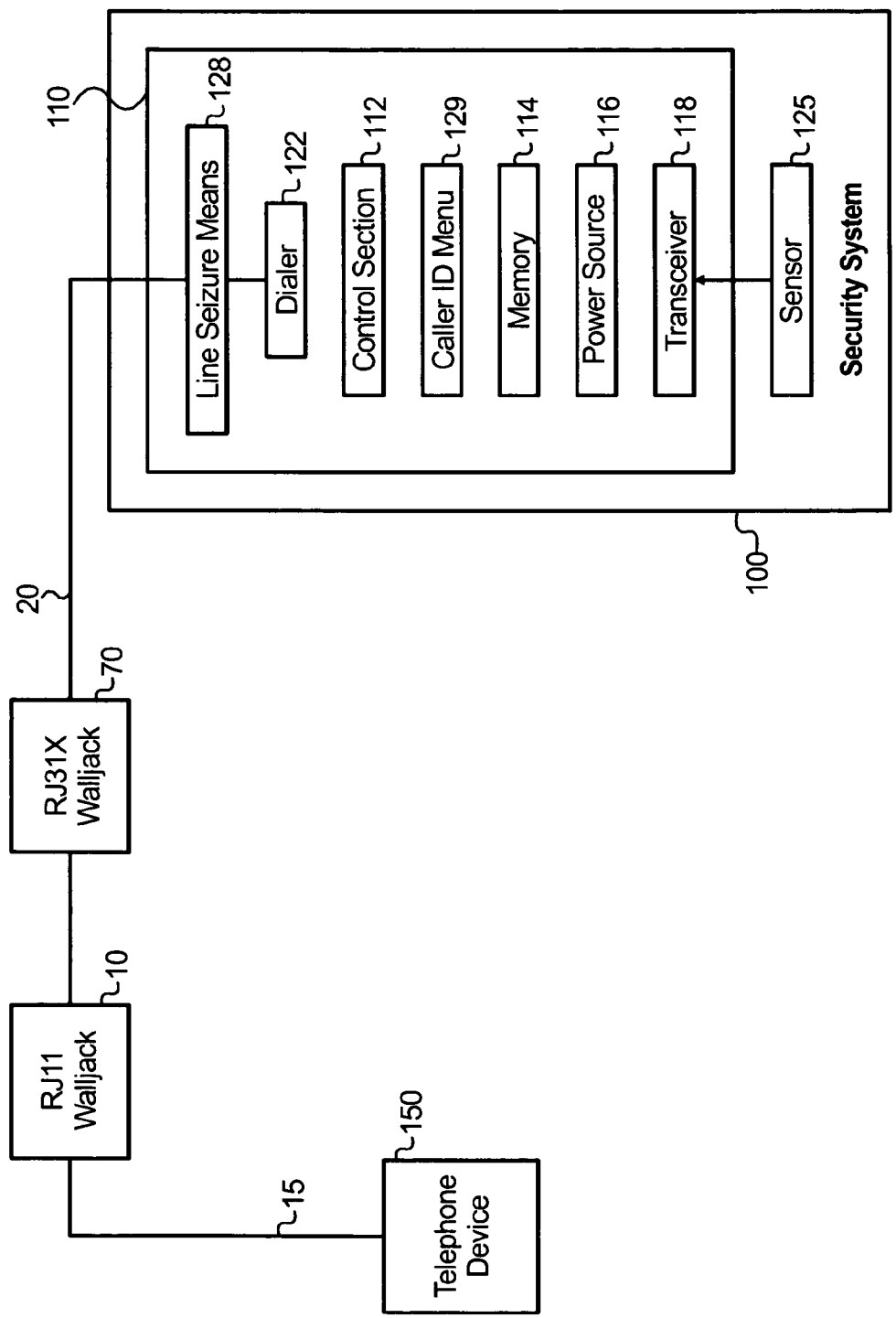
FIG. 1a illustrates an overview of an exemplary call blocking security system according to the invention.

FIG. 1a illustrates an overview of an exemplary call blocking security system 1 according to the invention. The call block security system 1 includes at least one telephone device 150 and a security system 100. For purposes of the description of the invention one telephone 150 will be used, however, any number of telephone devices 150 can be implemented in the call blocking security system 1. The telephone device 150 is connected to telephone network via a wall jack 10 using a telephone cord. In the preferred embodiment, the walljack 10 is an RJ11 standard modular phone Jack.

A plain old fashion telephone system ("POTS"), i.e., dial-up hard-wire communications, is the security systems 100 primary communications means using the telephone dialer 122. The security system 100 is connected at the entry point for phone service to the premises using a RJ31X jack 70. Typically, the RJ31X jack 70 is located in close proximity to control panel 110. This wiring is depicted in FIG. 1a as element 20. However, the attachment point can be at any location that permits the security system 100 to have control over the telephone line prior to the telephone device 150. This wiring arrangement permits "line seizure", a condition wherein the security system 100 can effectively disconnect all of the downstream telephone service to the premises and capture the line for its own purposes in order to permit uninterrupted communications during a security event, using a line seizure means 128. This line seizure means 128 will effectively relay or redirect the telephone service to the security system 100 and disconnect the telephone service to the telephone device. This redirection and disconnection is general for a short period to allow for the security system 100 to communicate with a remote monitoring station (not shown). For example, during this "seizure" period, the security system 100 can transmit an alarm signal to the central station.

In general, the line seizure means 128 is used to seize the communication means whenever the security system needs to contact the central monitoring station without interference from another communication using the communication means. Specifically, the line seizure means 128 is a relay that can cut off both incoming and outgoing communications.

A security system 100 includes a control panel 110 that communicates with a number of sensors 125 via a wired or wireless path. For example, the control panel 110 may receive signals from motion sensors that detect when a person enters a room. Signals received from fire sensors, such as smoke or heat sensors, indicate that a fire has been detected. Signals received from window and door sensors indicate that a window or door has been opened. The control panel 110 includes a control section 112, which can be a microprocessor, memory 114, a power source 116 and a transceiver 118, a dialer 122 and a line seizure means 128

The control section 112 includes a memory 114 for storing software or other instructions that are executed by the control section 112 to achieve the functionality described herein may be considered a program storage device.

The control section 112 also includes an external clock that maintains the time and date for the security system 100. Additionally, the control section 112 can include a timing means and a comparison means to implement the functionality described herein. The control panel 110 may also transmit signals to components of the security system 100. For example, signals may be transmitted to a siren 120 to activate the siren when an alarm condition is detected. Signals may be sent to the user interface device 140 to display status information to the user, such as whether the system is armed or disarmed, or whether a specific door or window has been opened.

The control panel 110 can include a user interface device 140 integrated with the control panel 110 or a separate peripheral device can be connected to the control panel 110. The user interface device 140 is commonly provided in the home such as by affixing it to a wall or placing it on a table, for instance, while the control panel 110 generally is a larger component that may be installed, e.g., in a closet or basement. However, it is not necessary for the user interface device 140 to be separate from the control panel 110, or to communicate by wireless signals with the control panel 110. For example, the user interface device 140 may be integrated into the control panel 110. Optionally or additionally, a user interface device may be hardwired to the control panel 110.

Signals received from a peripheral user interface device 140, e.g., including a keypad and display, may arm and disarm the system, as well as trip an alarm via a panic button feature. Typically, the user interface device 140 is the primary interface between the human user and the security system 100. The user interface device 140 typically includes components that are analogous to the control panel 110, including a control, memory and power source. Optionally, the user interface device 140 includes a transceiver.

Figure 1B:
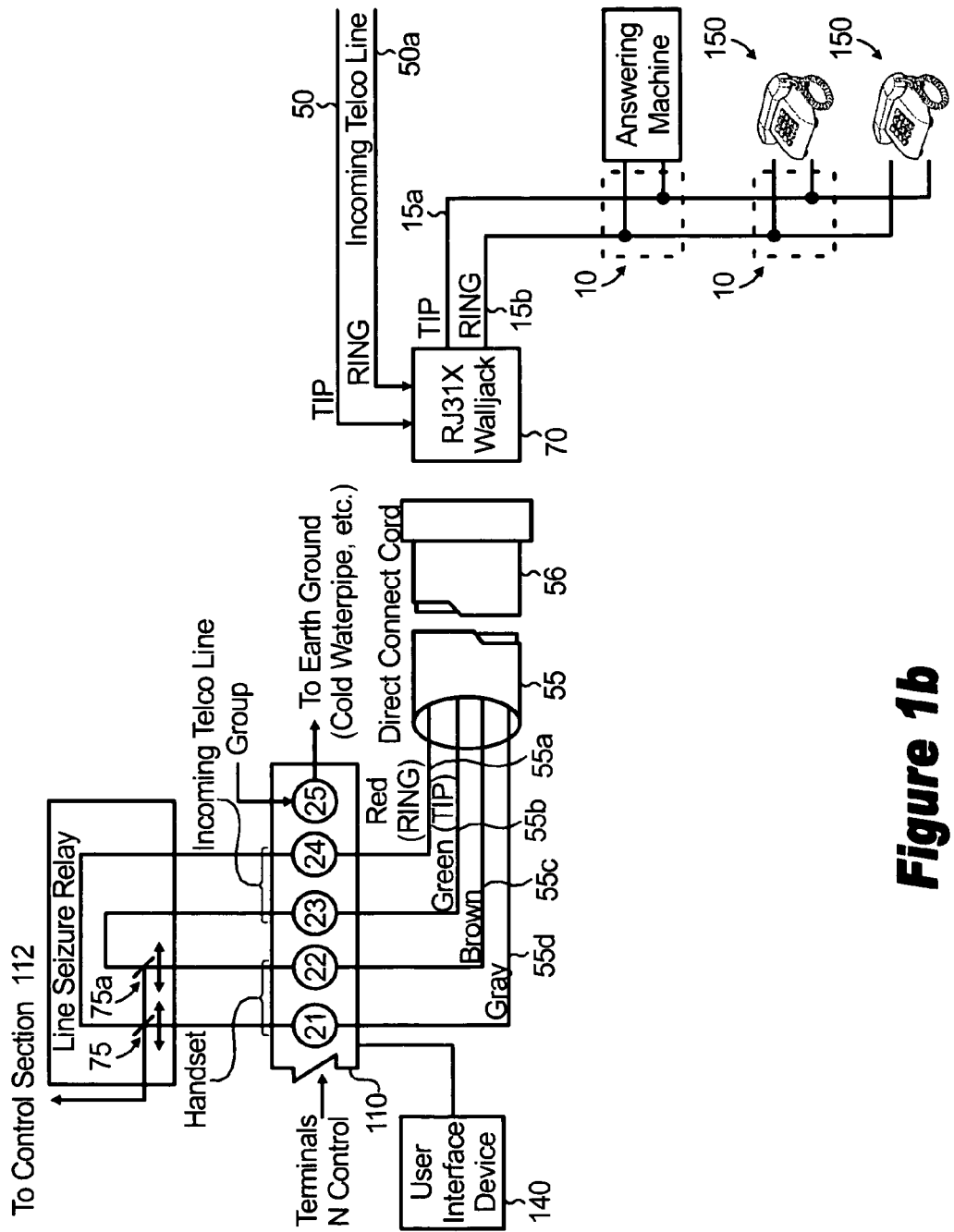
FIG. 1b illustrates an diagram of the connection between the security system, the telephone device and incoming telephone line according to the invention.

FIG. 1b depicts the connection of the security system 100, telephone device 150 and the RJ31x Jack 70 according to the invention. The incoming telephone line from the telephone company has two portions, a TIP 50 and a Ring 50a. Tip is a nickname for an electrically positive terminal and Ring is a nickname for an electrically negative terminal.

TIP 50 and ring 50a are coupled to the RJ31x Jack 70. The security system 100 is connected to the RJ31x Jack 70 using the direct connect cord 55 and plug 56. The direct connect cord 55 includes four distinct wires, a red wire, which is the incoming security ring wire 55a (hereinafter "security ring 55a"), a green wire, which is the incoming security TIP wire 55b (hereinafter "security TIP 55b", a brown wire, which is the outgoing handset TIP wire 55c (from the security system to the telephone) device 150 (hereinafter "outgoing handset TIP 55*c*") and the gray wire, which is the outgoing handset ring wire 55*d* (hereinafter "outgoing handset ring 55*d*"). The security ring 55*a*, security TIP 55*b*, outgoing handset TIP 55*c*, outgoing handset ring 55*d* are connected to the control panel (connections are depicted as 21-24 respectively.) The telephone device 150 is coupled to the RJ11 Jack 10, which is electronically connected to the RJ31x using a TIP wire 15*a* and a ring wire 15*b*.

The security ring 55*a* wire and the outgoing handset ring 55*d* wire can be connected by the line seizure means 128 to close a ring circuit. The ring circuit with respect to the telephone device will include the security ring 55*a* wire, the outgoing handset ring 55*d* wire, the ring wire 15*b* and the ring 50*a* wire from the telephone company.

Additionally, the security TIP 55*b* wire and the outgoing handset TIP 55*c* wire can be connected by the line seizure means 128 to close a TIP circuit. The TIP circuit with respect to the telephone device 150 will include the security TIP 55*b* wire, the outgoing handset TIP 55*c* wire, the TIP wire 15, and the TIP 50 wire from the telephone company.

The line seizure means 128 can be a relay device. FIG. 1*b* depicts two double-pole, double throw relays 75, 75*a*. One relay device controls the ring and other control the TIP. The double-pole, double throw relay 75 can open or close the connection for the ring, i.e., security ring 55*a* wire and the outgoing handset ring 55*d*. The double-pole, double throw relay 75*a* can open or close the connection for the TIP, i.e., security TIP 55*b* wire and the outgoing handset TIP 55*c*.

Each double-pole, double-throw relay 75, and 75*a* has two positions, a first position and a second position. In a first position the incoming telephone line from the telephone company, either the TIP 50 and/or a Ring 50*a* will be directly coupled to the security device 100 and the connection to the telephone device 150 from the telephone company will be open (open circuit with respect to the telephone device 150). In a second position the incoming telephone line from the telephone company, either the TIP 50 and/or a Ring 50*a* will be coupled to the telephone device 150. In either position, the security system 100 has access to monitor the incoming telephone line for an incoming call.

The control section 112 can separately control each double-pole, double throw relay 75, 75*a* as needed or control both relays together. In the preferred embodiment, both double-pole, double throw relay 75, 75*a* will be switched together.

Figure 2:
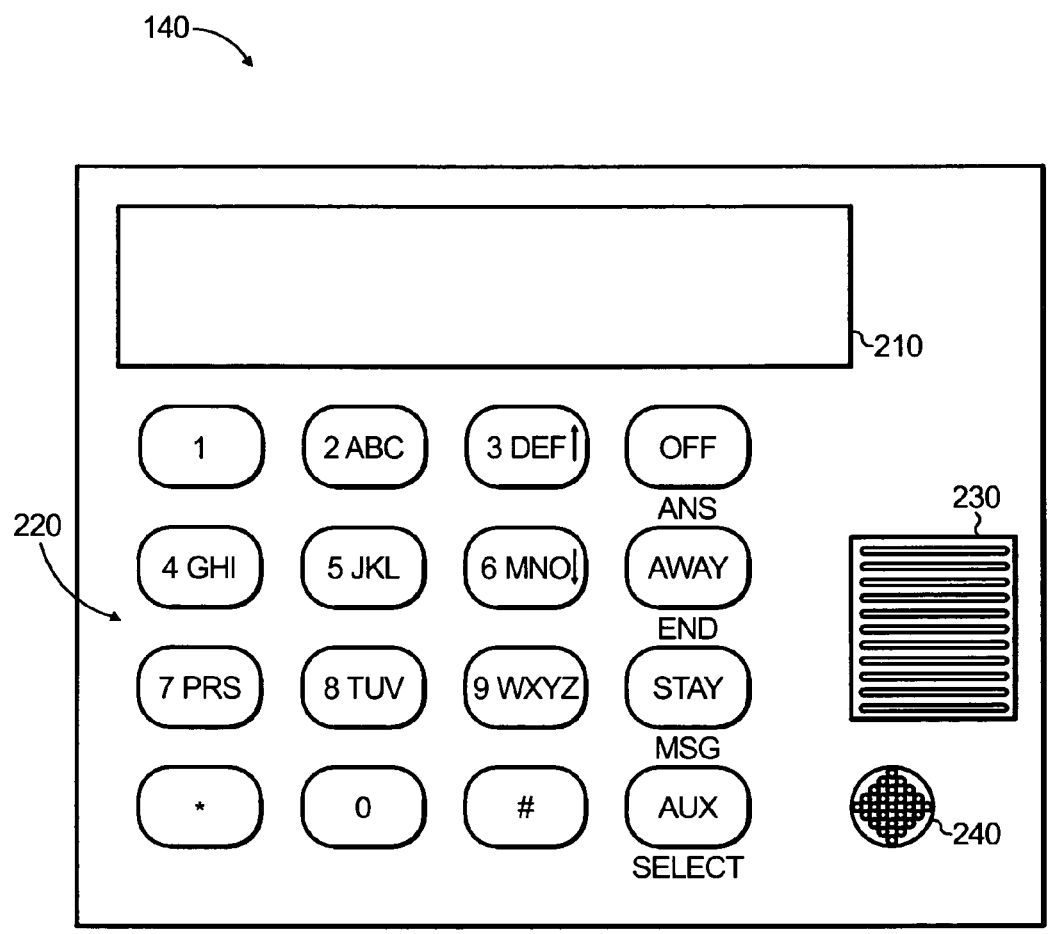
FIG. 2 illustrates an example of a user interface device according to the invention.

According to the invention, a user can actuate a user interface device 140 to block a incoming call by using the line seizure means 128, i.e., double-pole, double throw relay 75, 75*a* to open or close a connection to the telephone device 150. FIG. 2 illustrates an example of a user interface device 140 that can be used with the instant invention.

As mentioned, the user interface device 140 can be provided, e.g., as a peripheral to the main control panel 110, or as part of the main control panel 110. Thus, the functionality that is described herein as being provided by a user interface device may be provided wholly locally to the device 140, or partially remotely, such as at the associated control panel 110. The user interface device 140 includes a user input component such as a keypad 220 and/or microphone 240 for speech recognition in a voice-activated system, and a user output component such as a display 210 and/or speaker 230. The display 210 may be a multi-line, multi-character LCD display, for instance. Additionally, user interface device 140 can include a graphic keypad user interface.

Advantageously, the user interface device 140 may be of the type that is used for controlling a home security system so no re-design, e.g., to provide additional keys on the keypad 220, is necessary to achieve the additional functionality of controlling the telephone line connection to the telephone device It is also possible to provide the user interface device 140 as a device that is dedicated to blocking calls to the telephone device 150. In one approach, functions can be assigned to existing keys to accommodate the functionality of the present invention. For example, assigning a key to be depressed for the "do not disturb/sleep mode" or several keys for programming the security system to execute the blocking feature.

When the user enters the desired commands for controlling the security system 100, a transmitter associated with the user interface device 140 sends a user-generated signal via a wireless and/or wired path that is encoded with the user-selected command.

Figure 3:
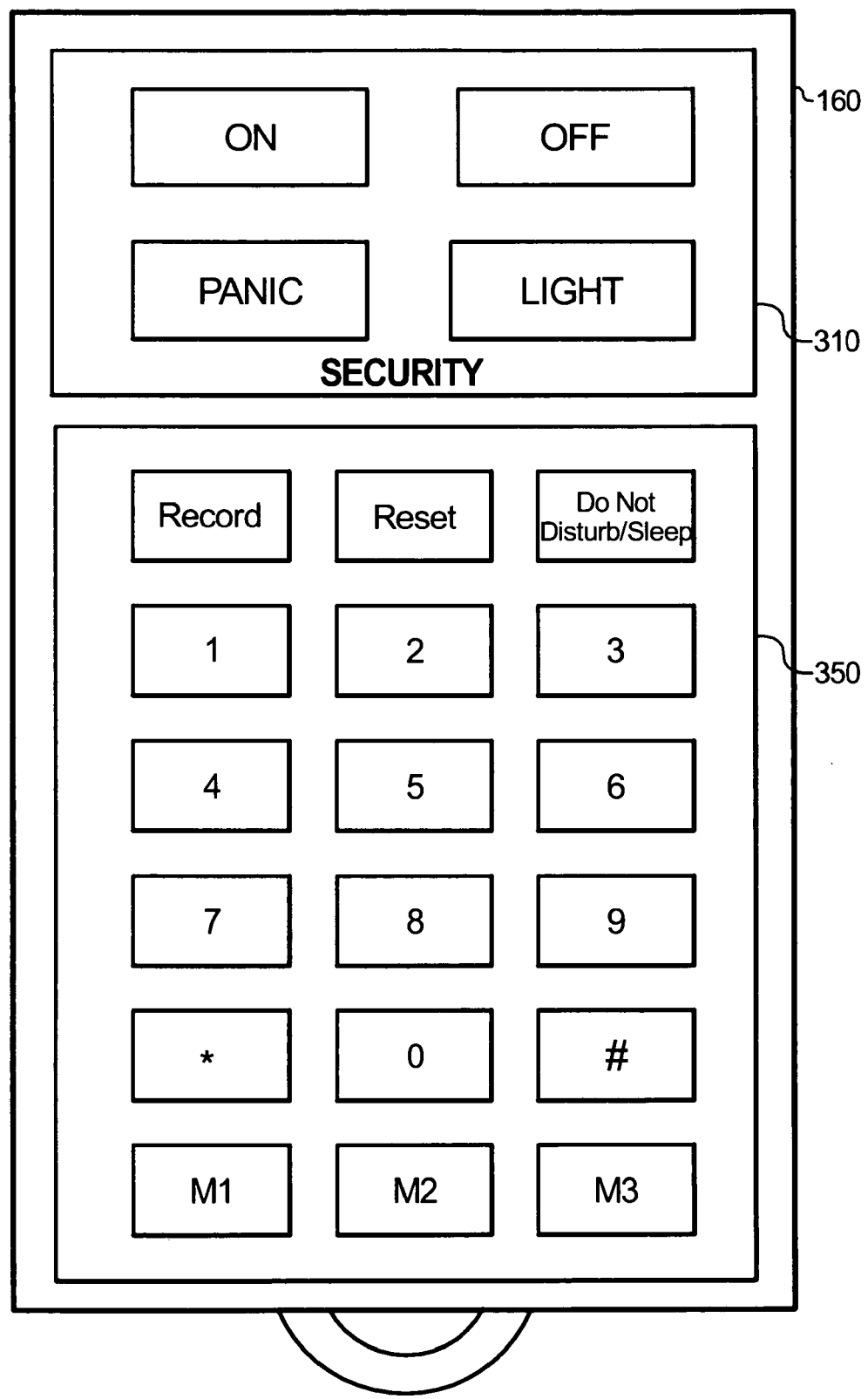
FIG. 3 illustrates an example of a user-operated transmitter according to the invention.

Alternatively, the user interface device can be a user-operated transmitter may be a handheld portable transmitter such as a key fob transmitter. FIG. 3 illustrates an example handheld user-operated transmitter according to the invention. The user-operated transmitter 160, which is shown as being a key fob transmitter, can be any portable device that can be easily operated by the user. The user-operated transmitter 160 includes a number of user-actuatable components such as keys that allow the user to enter desired commands for pre-programming the security system 100 to block calls from the telephone device 150, based upon programmed blocking criterion or isolate the line from the telephone device 150 immediately for a sleep or do not disturb mode. In one approach, the user-operated transmitter 160 includes keys 310 for controlling the security system 100.

These keys may include an ON key for arming the security system, an OFF key for disarming the security system, a PANIC key for triggering a panic alarm, and a LIGHT key for turning lights in the home on or off.

The user-operated transmitter 160 also includes keys 350 implementing the functionality desired for either immediately blocking all calls to the telephone device 150 or programming the security system 100 to block call to the telephone device. These keys may include a predefined key for "do not disturb mode/sleep mode", resetting the security system 100, and recording an outgoing message. Additionally, keys 350 will include a telephone keypad with digits 0-9 for entering a caller identification number for use by the security system 100 to block a call.

A voice interface may be used as well. Moreover, the user-operated transmitter 160 need not be a key fob but can be any convenient device. For example, the functions of the user-operated transmitter 160 may be incorporated into a television remote control or other device that is found around the home or office, whether the device is portable or not.

The security system 100 will include a program installed in the control panel 110 that allows the security system 100 to implement the do not disturb mode/sleep mode and pre-programmed call blocking. This program will also configure the control panel 110 to instruct the line seizure means 128 open or close a relay affecting a change in the connection between the incoming telephone company line, TIP 50 and ring 50*a*, and the telephone device 150 based upon the mode of operation and blocking criterion stored in memory 114.

This program or software package can be installed into the control panel 110 at the time of installation or when manufactured. Alternatively, the program can be uploaded to the control panel 110 from a remote location after installation.

By using the line seizure means 128 in this manner the security system 100 can block any incoming calls.

In an embodiment of the invention, the user can block all call, i.e., prevent the telephone device 150 from receiving the call and ringing, by simply depressing a predefined key on the user interface device 140 or user-operated transmitter 160. The control panel 110 will cause line seizure means 128 to open the connection between the Ring 50a and/or TIP 50 wires from the telephone company and the telephone device 150.

In this embodiment, the security system 100 will continue to block all incoming calls from reaching the telephone device 150 until the user resets the security system 100 by depressing another predefined button on the user interface device. As used in this application "resetting" means an indication that the user does not want to block a telephone call anymore.

Alternatively, the user can define a specific sleep period. The sleep period can be a time increment, in minutes or hours. A timer means, in either the control section 112 or user interface device 140 will countdown the sleep period. The sleep period will be stored in the memory of the user interface device 140 or memory of the control panel 110. Alternatively, the user can select a default sleep period. For example, the default sleep period can be two hours.

The security system 100 will seize the communication line for the entire sleep period, open at least one circuit to the telephone device. In one embodiment, the control section 100 can instruct the line seizure means 128 to open the ring circuit to the telephone device 150, i.e., first position of double-pole, double-throw relay 75. The telephone device 150 will be prevented from ringing. In another embodiment, the control section 100 can instruct the line seizure means 128, i.e., relays, to open both the ring and TP circuit to the telephone device, first position for both, double-pole, double-throw relays 75, 75a. Any call received during this sleep period will be automatically blocked according to one of the above-identified manners.

Optionally, the user can record an outgoing message informing an incoming caller that the user does not want to receive any incoming telephone calls during the "do not disturb" or "sleep period". This outgoing message can be played when an incoming telephone call is received. Alternative, a pre-stored default message can be played, e.g., "do not disturb".

Figure 4A:
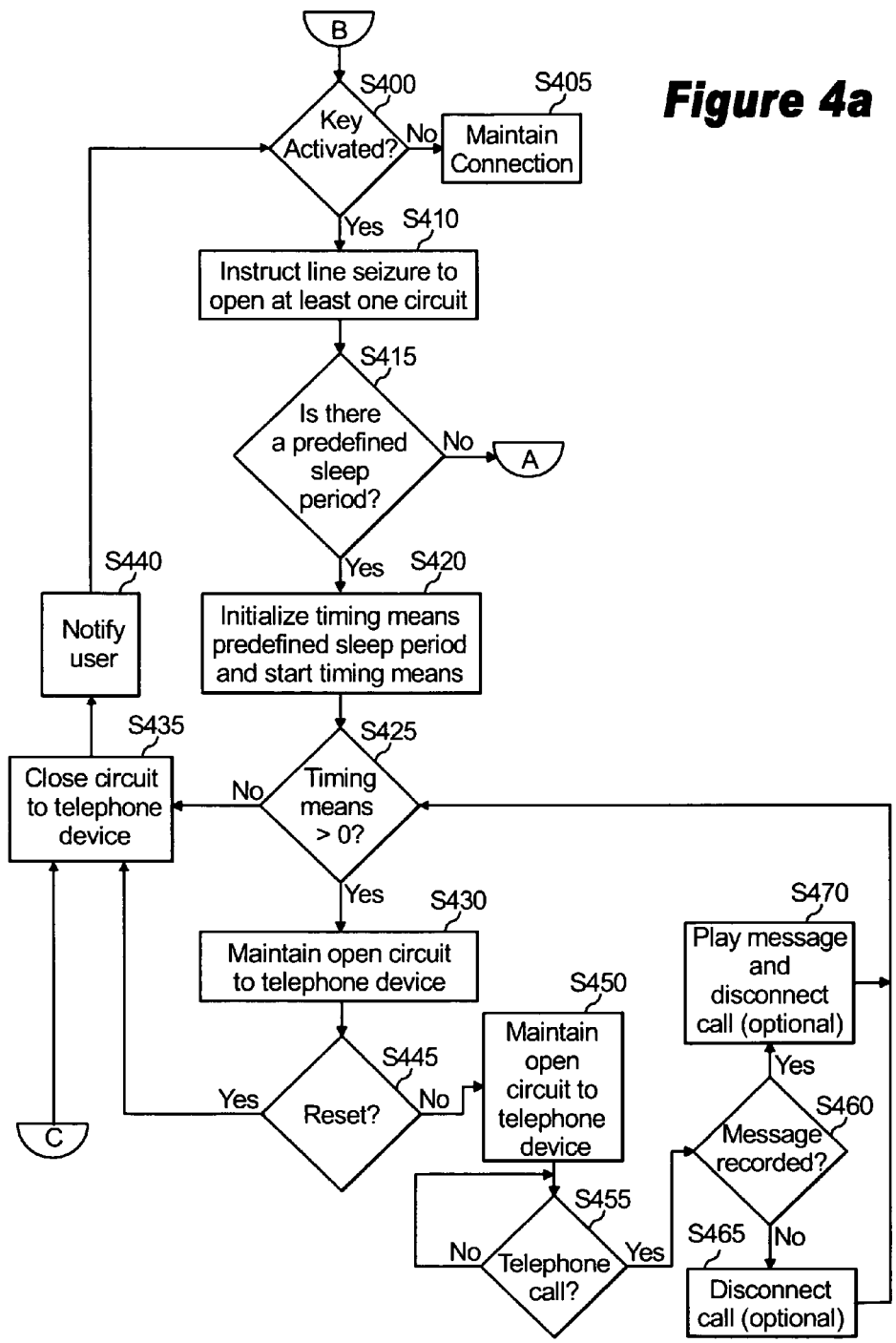
FIGS. 4a and 4b illustrate a flow chart for the do not disturb mode/sleep mode according to an embodiment of the invention.
Figure 4B:
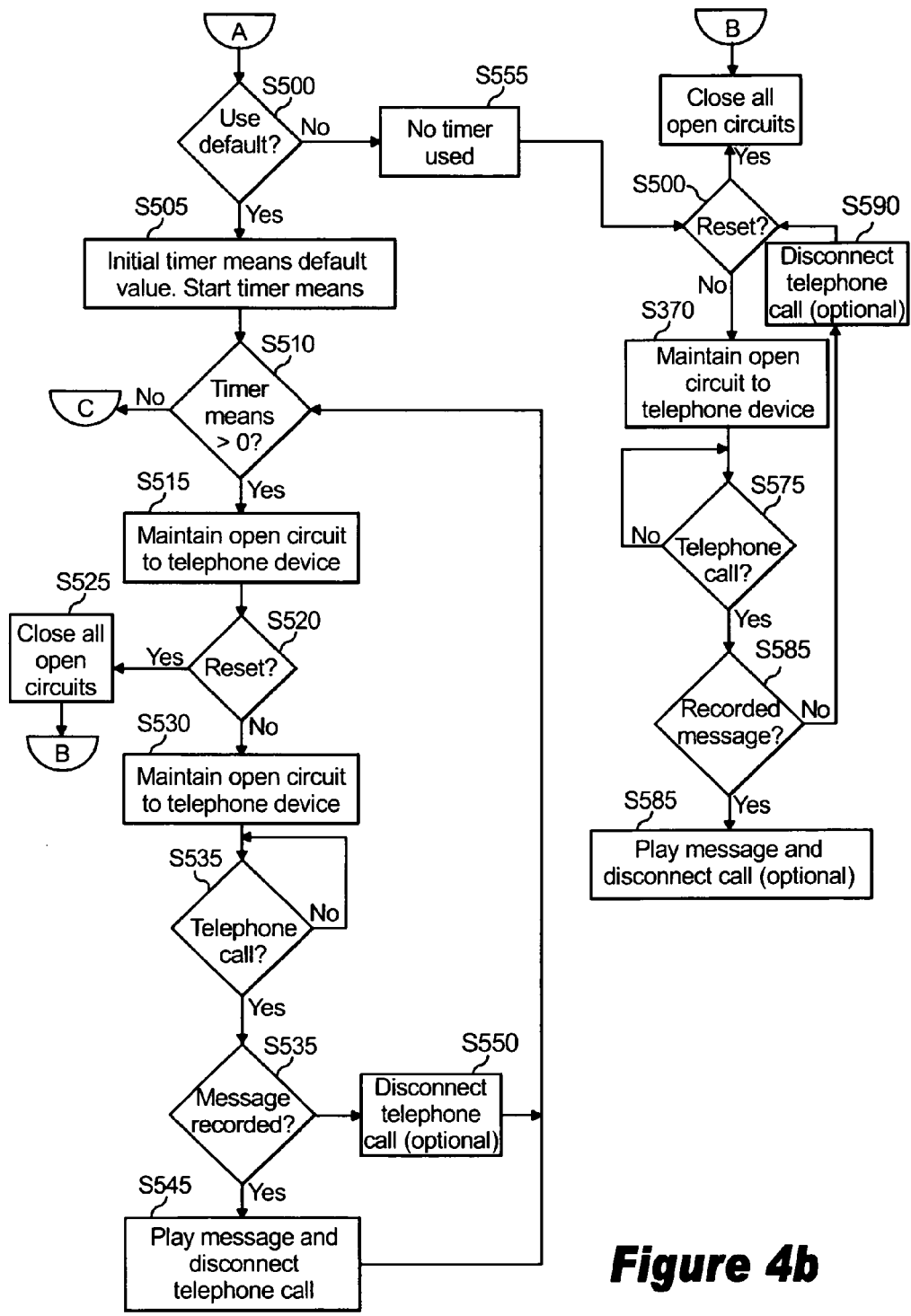

FIGS. 4a and 4b illustrates a flow chart for the do not disturb mode/sleep mode in accordance with the invention. FIGS. 4a and 4b are labeled as "S" followed by the step number to save space; however, for descriptive purposes the invention will be described using the term "Step" followed by the step number.

At Step 400, the control section 112 will determine if the user has actuated a predefined key to initiate the do not disturb mode. If the control section 112 detects that the predefined key has not been actuated, the control section 112 will instruct the line seizure means 128 to maintain the connection of both the TIP and ring circuit to the telephone device 150, at step 405. If the control section 112 detects that the predefined key has been actuated, the control section 112 will instruct the line seizure means 128 to open at least one of the TIP and ring circuit to the telephone device 150, at step 410, thereby routing the incoming telephone line, i.e., TIP 50 and/or ring 50a away from the telephone device. Specifically, either one or both the double-pole, double throw relays 75 and 75a will move to the first position. The control section 112 will then determine if the user entered a predefined sleep time, at step 415. If it is determined that the user entered a predefined sleep period, the control section 112 will initialize a timing means to count down the sleep period, at step 420. Additionally, the control section 112 will activate the timing means, at step 420. The control section 112 continuously monitors the timing means to determine if the sleep period expires, at step 425. If the control section 112 detects that the sleep period expires, i.e., the value of the timing means equals zero, then the control section 112 will instruct the line seizure means 128 to close the opened circuit to the telephone device 150, at step 435, i.e., either the TIP circuit and/or the ring circuit. Specifically, either one or both the double-pole, double throw relays 75, 75a will move to the second position. The connection to the incoming telephone company line, TIP 50 and ring 50a will be restored and the telephone device 100 will be able to receive calls. Additionally, the control section 112 will notify the user that the sleep period has expired, at step 440. This notification can be an audible siren or tone, a digitized voice message or a visual light indicator. The user will have the option to continue the do not disturb mode/sleep mode by depressing the predefined key on the user interface device 140 or user-operated transmitter 160. In one embodiment, the new sleep period can be the same value as used prior. Alternatively, the user can enter a different time for the sleep period.

If the sleep period has not expired, the control section 112 will instruct the line seizure means 128 to maintain the open circuit to the telephone device 150, at step 430.

The control section 112 will then determine if the user has reset the security system, instructing the security system to stop blocking calls, at step 445. If the user has depressed the reset key, the control section 112 will instruct the line seizure means 128 to close all open circuit with respect to the telephone device The telephone device will be able to receive calls. Additionally, the control section 112 will notify the end user that the security system 100 is reset and no longer in "do not disturb mode/sleep mode", at step 440.

If the control section 112 determines that the user has not reset the do not disturb mode/sleep mode, the control section 112 will instruct the line seizure means 128 to maintain the open circuit with respect to the telephone device 150, at step 450, i.e., at least one of the double-pole, double throw relays 75, 75a will remain in first position. In one embodiment, during the do not disturb mode, the control section 112 monitors the incoming calls (step 455). If the control section 112 detects an incoming telephone call, when the security system is operating in "do not disturb mode/sleep mode", the control section 112 will determine if an outgoing message has been recorded for playback. Specifically, the control section 112 will search the memory 114 for any recorded message. If there is an outgoing message, the control section 112 will play the recorded message, at step 470. The control section 112 will briefly answer the incoming call to play the recorded message. Once the recorded message has been played, the control section 112 can optionally disconnect the incoming telephone call.

If there is no recorded message, the control section can disconnect the incoming telephone call, at step 465. Step 465 is an optional step.

As mentioned above, if the control section 112 determines that the user input a specific sleep period, the control section 112 will initialize the timing means with the input value, at step 415. However, if no such specific sleep period was input, the control section 112 will then determine if the user indicated that a default time should be utilized, at step 500. If, at step 500, the control section 112 determines that the default value should be used, the control section 112 obtains this value from memory 114. Using the value obtained from memory 114, the control section 112 will initialize the timing means to count down the default time as the sleep period, at step 505. Additionally, the control section 112 will activate the timing means, at step 505.

The control section 112 will continuously monitor the timing means to determine if the sleep period expires, at step 510. If the control section 112 detects that the sleep period expires, i.e., the value of the timing means equals zero, then the control section 112 will instruct the line seizure means 128 to close the open circuit to the telephone device 150, at step 435, i.e., both of the double-pole, double throw relays 75, 75a will be in second position. The telephone device will be able to receive calls. Additionally, the control section 112 will notify the user that the sleep period has expired, at step 440.

If the sleep period has not expired, the control section 112 will instruct the line seizure means 128 to maintain the open circuit to the telephone device 150, at step 515 i.e., at least one of the double-pole, double throw relays 75, 75a will remain in first position.

The control section 112 will then determine if the user has reset the security system 100, instructing the security system 100 to stop blocking calls, at step 520. If the user has depressed the reset key, the control section 112 will instruct the line seizure means 128 to close the open circuit with respect to the telephone device 150, at step 525, i.e., both of the double-pole, double throw relays 75, 75a will be in second position. The telephone device will be able to receive calls. Optionally, the control section 112 can notify the user that the security system 100 is reset and no longer in do not disturb mode/sleep mode.

If the control section 112 determines that the user has not reset the "do not disturb mode/sleep mode", the control section 122 will instruct the line seizure means 128 to maintain the open circuit with respect to the telephone device 150, at step 530 i.e., at least one of the double-pole, double throw relays 75, 75a will remain in first position.

In an embodiment of the invention, the control section 112 continuously monitors the redirected telephone line 15 for any incoming calls (step 535). If the control section 112 detects an incoming telephone call, the control section 112 can determine if an outgoing message has been recorded for playback, at step 540. The control section 112 will search in memory 114 for any recorded message and if there is a recorded message, the control section 112 will cause the message to be played, at step 545. The control section 112 will briefly answer the incoming call to play the recorded message. Once the recorded message has been played, the control section 112 can disconnect the incoming telephone call, at step 545.

If there is no recorded message, the control section can optionally disconnect the incoming telephone call, at step 550.

If neither a specify sleep period nor a default sleep period is selected, the do not disturb mode/sleep mode will continue for an indefinite period of time, at step 555. A timing means will not be used. The user can stop the do not disturb mode/sleep mode by resetting the mode, i.e. depressing a predefined key. The control section 112 will monitoring the system to determine if the user depresses the defined reset key, either on the user interface device 140 or the user-operated transmitter 160. If the control section 112 detects that the defined reset key has been depressed, the control section 112 will instruct the line seizure means to close all open circuits with respect to the telephone device 150, at step 565, i.e., both of the double-pole, double throw relays 75, 75a will be in second position. The process will then process to step 400.

If the control section 112 determines that the user has not reset the do not disturb mode/sleep mode, the control section 122 will instruct the line seizure means 128 to maintain the open circuits with respect to the telephone device, at step 570530 i.e., at least one of the double-pole, double throw relays 75, 75a will remain in first position.

In an embodiment of the invention, the control section 112 continuously monitors redirected telephone line 15 for any incoming calls (step 575). If the control section 112 detects an incoming call, the control section 112 will determine if a outgoing message has been recorded for playback, at step 580. The control section 112 will search in memory 114 for any recorded message and if there is a recorded message, the control section 112 will cause the message to be played, at step 585. The control section 112 will briefly answer the incoming call to play the recorded message. Once the recorded message has been played, the control section 112 can disconnect the incoming telephone call, at step 585.

If there is no recorded message, the control section 112 can optionally disconnect the incoming telephone call, at step 590.

In another embodiment of the invention, the control section 112 can monitor if the user attempts to initiate an outgoing telephone call by using the telephone device 150. If the control section 112 detects such operation of the telephone device 150, the control section 112 can instruct the line seizure means 128 to close all open circuits with respect to the telephone device 150 to enable as outgoing telephone call, i.e., both of the double-pole, double throw relays 75, 75a will be in second position.

In an embodiment of the invention, before any call is disconnected the control section 112 can determine the source of the incoming call. This is to prevent a call from the central monitoring station or the downloader from immediately being disconnected.

According to an embodiment of the invention, the user can program or configure the security system 100 using the user interface device 140 or user-operated transmitter to block, in the future, one or more incoming calls based upon at least one predetermined criterion. Once the predetermined criterion have been programmed into the security system 100 and stored in memory 114, the security system 100 can block an individual call or all calls without the user depressing any key to initiate the blocking. The predetermined criterion can be a caller ID of the calling party. This will allow a user to block an incoming telephone call from a specific calling party based upon the calling party's telephone number. This will prevent a user from receiving unwanted phone calls, e.g., telemarketers, ex-wives, etc. . . In another embodiment, the user can create a list of allowable callers by programming certain numbers or identification information into the security system. Once this list is programmed into the system, the list is stored in memory. The list can be updated, however, once a number has been entered, the number does not have to be reprogrammed.

Alternatively, the predetermined criterion can be a time of the day or a specific time period (T). Thus, the user can create a "do not disturb schedule". An advantage of the "do not disturb schedule" is that a user can not be disturb by an telephone call during certain times of the day, e.g., during family meals, naps, studying, watching TV, night, or studying. Specifically, the user can generate a schedule where the security systems will automatically, block all calls. For example, the user can program the security system to block all calls after 10PM and before 7AM, during the business week, and all calls after 12AM and before 10AM on the weekends (except from the central station or downloader).

In another embodiment of the invention, the predetermined criterion can be the status of the security system. For example, when the security system is armed or in sleep mode, all telephone calls can be blocked. Specifically, the user can program the security system 100 to block all incoming telephone calls based upon the status of the security system 100 (except from the central station or downloader).

When the predetermined criterion is a caller ID, the security system 100 obtains the caller ID information between the first and second ring for the incoming call. This caller ID information is compared with a list of numbers stored in the memory 114 of the control panel 110. When the caller ID information matches a number or other identification information stored in memory 114, the security system 100 will either block or allow the incoming call by opening or closing at least one of the TIP or ring circuits to the telephone device 150 using the line seizure means 128, depending on the predetermined criterion.

Figure 5:
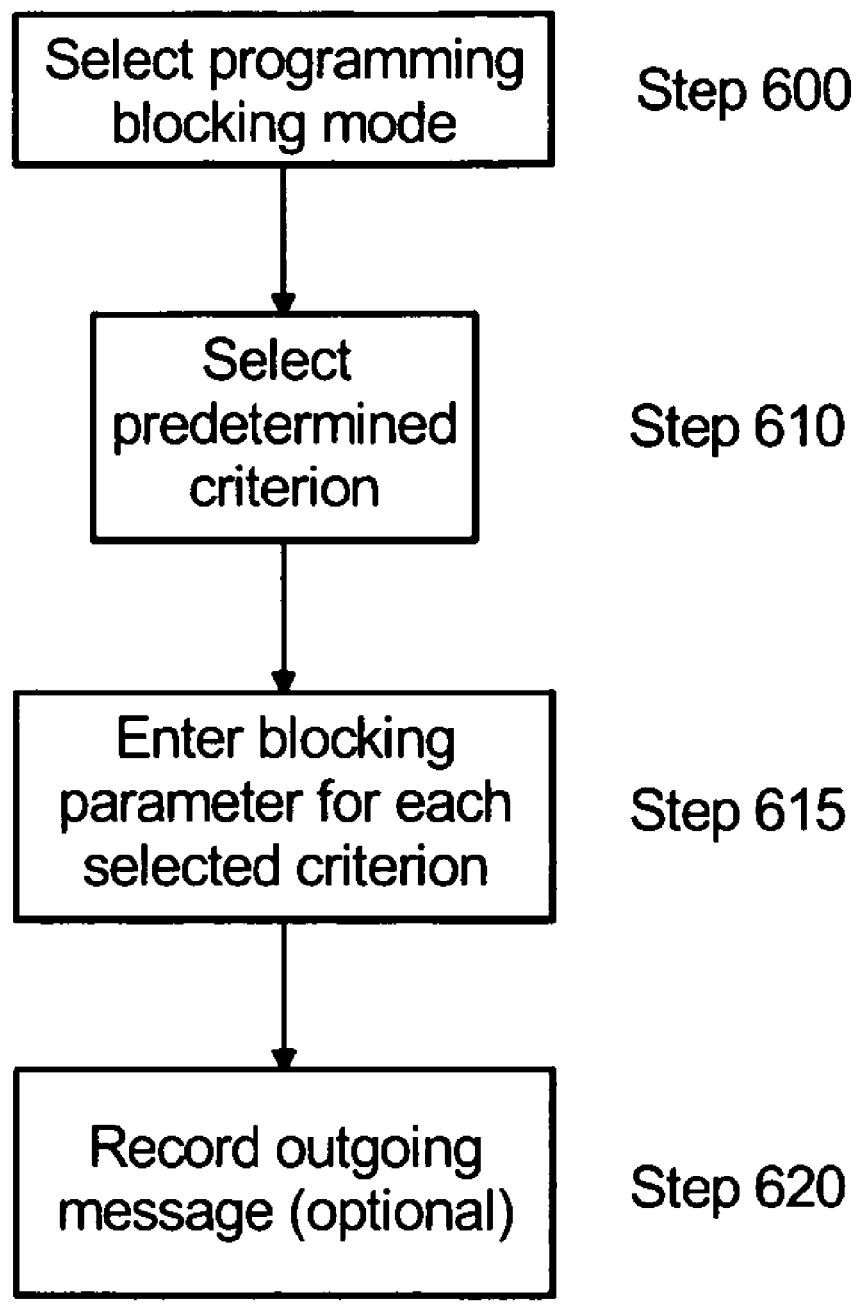
FIG. 5 illustrates a flow chart for programming the security system to block calls.

FIG. 5 is a flow chart showing the sequence of programming a security system 100 to block an incoming telephone call, to create a schedule for blocking all incoming telephone calls or to assign the blocking function to a specific status of the security system. In operation, the user inputs at least one predetermined criterion for blocking an incoming through the user interface device 140 or user-operated transmitter 160. Depending on the selected predetermined criterion, the user interface device 140 will prompt the user to input other information used to block an incoming telephone call.

The process begins at step 600. The user will select the call blocking mode using the user interface device 140 or user-operated transmitter 160. The user enters the programming mode by using the keys or buttons on the user interface device 140 or user-operated transmitter 160. Once in programming mode, the user interface device 140 or user-operated transmitter 160 can optionally prompt the user to select at least one predetermined criterion, at step 610. As described above, the predetermined criterion can be a specific time, a particular party or group of calling party, status of security system).

Once the predetermined criterion is selected, the user interface will prompt the user to enter at least one corresponding blocking parameter for the criterion. Each different predetermined criterion has its own set of blocking parameter.

If the predetermined criterion is a specific time schedule period or blocking schedule, the blocking parameters are units of time and a date. The user will program a schedule, including the date and start and end time for call blocking, at step 615.

If the predetermined criterion is a caller ID, the blocking parameters are telephone numbers or identification information. The user can use a plurality of telephone number or caller IDs, at step 615. Specifically, the user can enter a telephone number or identification information, using the keys on the user interface device 140 or user-operated transmitter 160. The telephone number or identification information can correspond to the specific person. Alternatively, the entered number can represent a group of numbers or caller IDs or identification information in which the end user does not want to receive an incoming call, e.g., all 800 numbers. To block all 800 number the end user would enter 800-XXX-XXXX as the telephone number. The security system 100 would then block all calls where the caller ID began with 800. Furthermore, the user can program the security system 100 using the user interface device 140 or user-operated transmitter 160 to block all calls where the call ID number is unavailable or private. This list of numbers or identification information is stored in the memory of the user interface device 140 or memory of the control panel 110.

In operation, the security system 100 will open at least one of the TIP and ring circuits to the telephone device 150 each time the caller ID matches one of the programmed telephone numbers stored in memory.

The user can program a plurality of telephone number or caller IDs, at step 615, for a person or group of persons, which the user will allow incoming calls. The process of entering the list of number is the same as set forth above.

In operation, the security system 100 will open at least one of the TIP or ring circuit to the telephone line 15 and only close the opened TIP and ring circuit to the telephone device 150 if the caller ID matches one of the programmed telephone numbers stored in memory.

In an embodiment of the invention, the user can determine whether to block an incoming telephone call base upon the status of the security system 100. This will be accomplished by selecting the call blocking feature for a particular security system status. For example, the end user can block all incoming telephone calls if the security system is armed. Additionally, if motion is detected when the system is armed, the security system can be programmed to unblock all calls, i.e., close TIP and ring circuits with respect to the telephone device 150.

The security system 100 still has the ability to send reports to the central station via the primary communication line even though the TIP or ring circuit with respect to the telephone device 150 are open.

Once all of the blocking parameters have been enters and the security system 100 initialized, the system is ready to block the incoming telephone calls. The blocking parameters only have to be programmed once. Therefore, after all of the parameters have been entered for any of the predetermined criterion, the user can simply walk over to the user interface device or operate the user-operated transmitter 160 and hit a few keys to updated the blocking information, such as to change the criterion. The security system 100 will automatically block the incoming call without any other activity from the user.

Figure 6A:
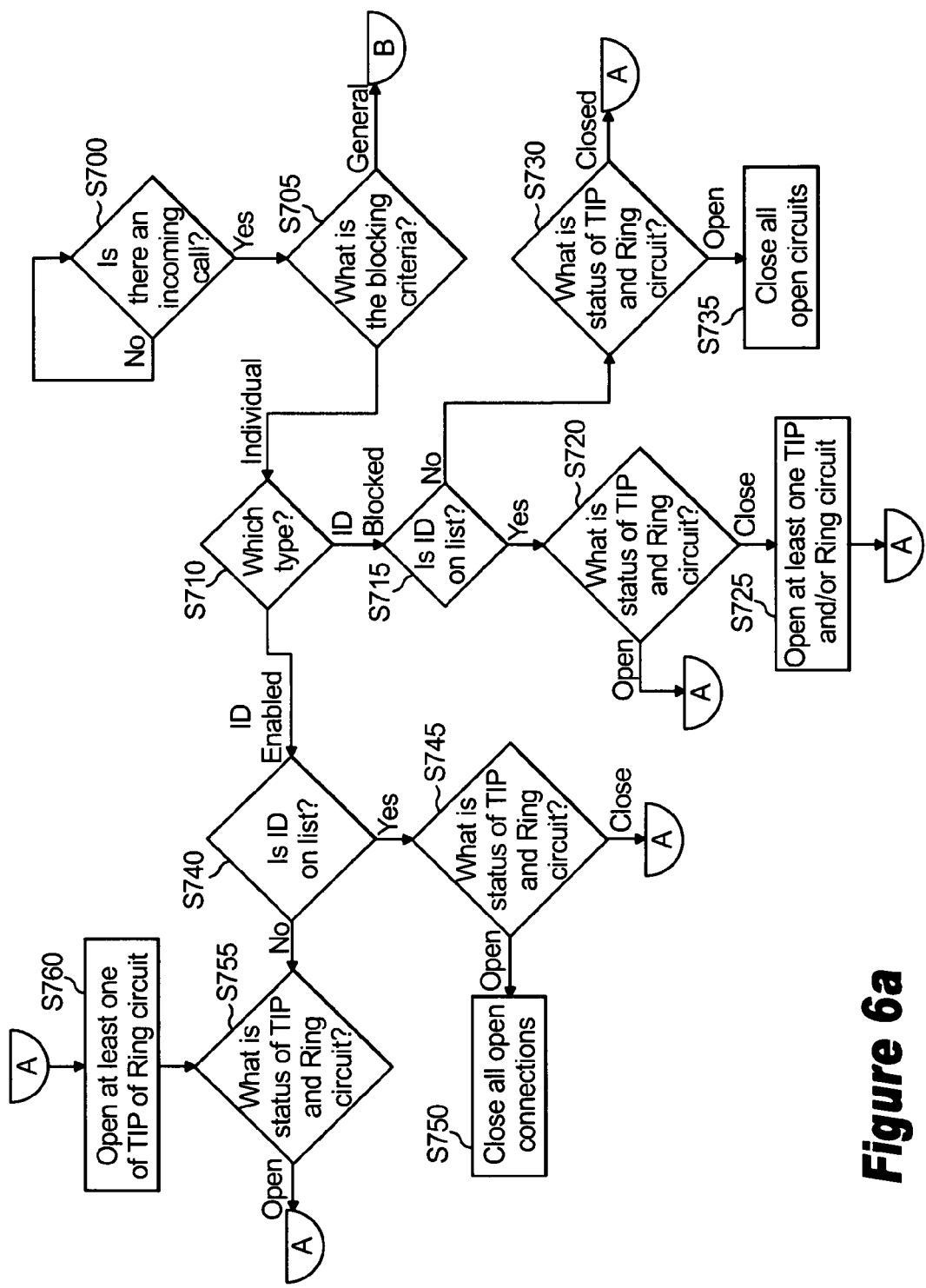
FIGS. 6a and 6b illustrate a flow chart for the operation of the call-blocking feature according to user programmed instructions.
Figure 6B:
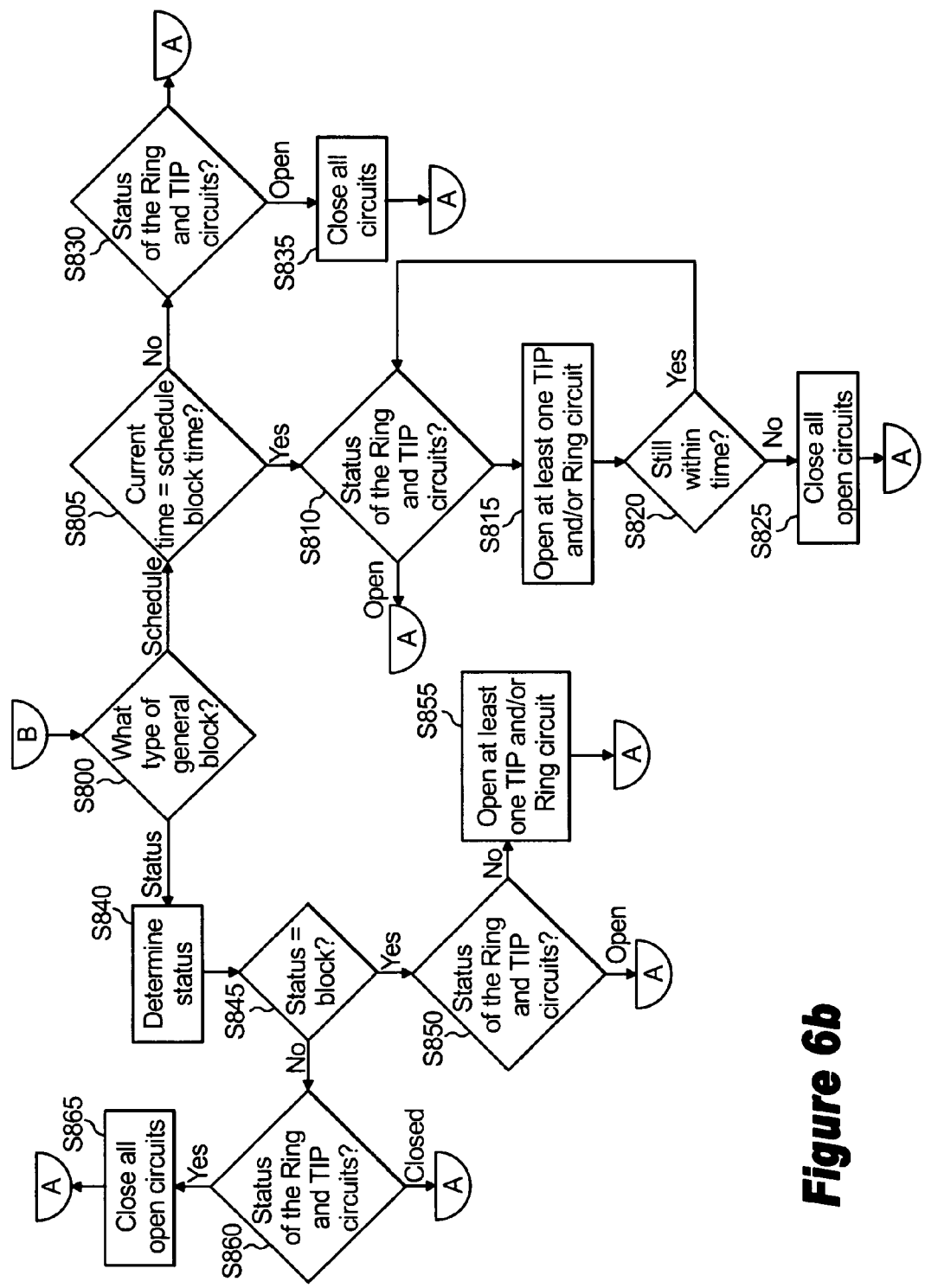

FIG. 6*a* and 6*b* illustrate a flow chart for the operation of the call-blocking feature according to the user programmed instructions.

The control section 112 will monitor the telephone line 15 for any incoming telephone calls, at step 700. If the control section 112 detects an incoming telephone call, at step 700, the control section 112 will determine whether to block the call based upon the predetermined criterion stored in memory 114. The control section 112 will search the memory 114 to determine if a predetermined criterion has been programmed and whether the predetermined criterion is a general blocking criterion or an individual blocking criterion. A general blocking criterion is one where all calls are block regardless of the caller identification, whereas an individual blocking criterion is dependent on the caller identification. For example, a general blocking criterion is the status of the security system 100 or a predefined blocking schedule. An individual blocking criterion includes blocking the incoming based upon the caller identification of the incoming telephone call or enabling the call to be answered based upon the caller identification of the incoming telephone call.

The control section 112 determines the categories of the blocking criterion at step 705. If the control section 112 determines that the blocking criterion is an individual blocking criterion, then the control section 112 will determine the type of individual blocking criterion, i.e., caller identification block or caller identification enabled.

Depending on the result of this determination, the process proceeds to either step 715 (caller identification blocking) or step 740 (caller identification enabling). For caller identification blocking, the control section 112 will determine if the caller identification corresponding to the incoming call was programmed by the user to be blocked. The control section 112 will obtain the caller identification for the incoming call between the first and second tone using a caller identification means 129. Once the caller identification has been obtained, the control section 112 will retrieve a user defined caller identification list from memory 114. A comparison means will compare the obtained caller identification with the caller identification list. If there is a match, control section 112 will cause the incoming call to be blocked. Specifically, the control section 112 will determine the status of the TIP and ring circuits, i.e., the connection to the telephone device 150, at step 720. If the either the TIP or the ring circuit is open, i.e., one of the double-pole, double-throw relays 75, 75a is in first position, then the control section 112 maintains the status or position, i.e., do nothing. The process will return to step 700. If the both the TIP and ring circuits are closed, i.e., both the double-pole, double-throw relays 75, 75a are in the second position, then the control section 112 will cause the line seizure means 128, e.g., either the double-pole, double-throw relays 75, 75a to move from the second position to the first position opening at least one of the ring or TIP circuit to the telephone device The opened circuit is for a period of time long enough for called to be disconnected, either by the caller hanging up their telephone or the security system 100 disconnecting the incoming telephone call.

Once the control section 112 the incoming telephone is disconnected or terminated, the control section 112 will instruct or cause the line seizure means 128 to close the opened circuits with respect to the telephone device 150, i.e., both the double-pole, double-throw relays 75, 75a switched to the second position. The process will proceed back to step 700.

If, the obtained caller identification does not match any of the caller identifications stored in memory 114, i.e., on the caller identification list, the control section 112 will not block the incoming telephone call. The control section 112 will determine the status of the TIP and ring circuits, at step 730. If the either of the TIP and ring circuits are opened, then the control section 112 will close them. In other words, the control section 112 will instruct the line seizure means 128, e.g., either the double-pole, double-throw relays 75, 75a, to stop seizing the line and allow incoming telephone calls to be routed to the telephone device 150. The process will return to step 700. If both the double-pole, double-throw relays 75, 75a are in the second position, i.e., ring and TIP circuit closed with respect to the telephone device 150 then the control section 112 will do nothing. The process will return to step 700.

Similarly, for caller identification enabling, the control section 112 will determine if the caller identification corresponding to the incoming telephone call was programmed by the user to be received by the telephone device 150 and answered by the user, i.e., enabled, at step 740. The control section 112 will obtain the caller identification for the incoming call between the first and second tone using caller identification means 129. Once the caller identification has been obtained, the control section 112 can retrieve the user defined caller identification list from memory 114. A comparison means (not shown) will compare the obtained caller identification with the caller identification list. If there is a match, control section will cause the incoming call to proceed to the telephone device Specifically, the control section 112 will determine the status of TIP and ring circuit, i.e., position of the double-pole, double-throw relays 75, 75a with respect to the telephone device 150, at step 745. If the either of the double-pole, double-throw relays 75, 75a in first position, i.e., open circuit with respect to the telephone device 150, then the control section 112 will cause the corresponding circuit and double-pole, double-throw relay to change its position, i.e., to the second position. The process will return to step 700. If the both circuits are closed with respect to the telephone device 150, then the control section 112 will maintain the connection, i.e., do nothing. The process will proceed back to step 700.

If, the obtained caller identification does not match any of the caller identifications stored in memory 114, i.e., on the caller identification list, the control section 112 will block the incoming telephone call. The control section 112 will determine the status of the TIP and ring circuit, i.e., position of the double-pole, double-throw relays 75, 75a with respect to the telephone device 150, at step 755. If either of the circuits are opened with respect to the telephone device, i.e., either of the double-pole, double-throw relays 75, 75a in first position, then the control section 112 maintains this status or position, at proceed to step 700, i.e., do nothing. If both the TIP and ring circuit with respect to the telephone device 150 are closed, i.e., both of the double-pole, double-throw relays 75 and 75a in second position, then the control section 112 will cause the line seizure means 128, e.g., at least one of the double-pole, double-throw relays 75 and/or 75a to moves to the first position, to prevent the telephone device 150 from ringing and/or to disconnect the incoming call. This switching in relay position is temporary. The process will proceed back to step 700.

If the control section 112 determines that the predetermined criterion is a general blocking criterion, at step 710, the process will proceed to step 800. The control section 112 will determine the type of general blocking criterion, i.e., security system status or predefined blocking schedule.

Based upon this determination, the process will proceed to either step 840 (security system status) or step 805 (predefined blocking schedule).

For the predefined blocking schedule, i.e., program schedule for blocking all incoming telephone calls, the control section 112 will determine if the current time is equal to the predefined blocking schedule, at step 805. The internal clock within the control section 112 determines the current time. The current time is compared, using a comparison means, with the predefined blocking schedule. If there is a match, i.e., the current time is within the predefined blocking schedule, then the control section 112 causes all calls to be blocked. Specifically, the control section 112 will determine the status of the TIP and ring circuits with respect to the telephone device 150, i.e., position of both double-pole, double-throw relays 75, 75a, at step 810. If either circuit is open with respect to the telephone device 150, i.e., one of the double-pole, double-throw relays 75, 75a, in first position, then the control section 112 maintains the status or position of the relay, i.e., do nothing. The process will return to step 700. If both the TIP and ring circuit are closed with respect to the telephone device 150, i.e., both double-pole, double-throw relays 75, 75a, in second position, then the control section 112 will cause the line seizure means 128, e.g., at least one of the double-pole, double-throw relays 75, 75a to change its position, opening the corresponding circuit with respect to the telephone device 150, at step 815. The switching is for the entire predefined scheduled blocking period. Optionally, in an embodiment, the control section 112 can disconnect and terminate the incoming telephone call. In another embodiment, the control section 112 can play a recorded outgoing message. This may be desired to inform the calling party that the called party does not want to receive any calls as this time. The recorded message is stored in memory.

The control section 112 then monitors the remaining time left in the predefined blocking schedule, at step 820. Once this predefined blocking schedule expires, the control section 112 causes the opened circuit with respect to the telephone device to be closed. In other words, the control section 112 will instruct the line seizure means 128 to stop seizing the line. The process will then proceed to step 700.

If, the current time does not match any of periods included in the predefined blocking schedule, the control section 112 will not block the incoming telephone call. The control 112 will determine the status of the TIP and ring circuits, i.e., position of both double-pole, double-throw relays 75, 75a, at step 830. If the either the TIP or ring circuit is open with respect to the telephone device 150, then the control section 112 will cause the opened circuit to be closed with respect to the telephone device, at step 835. In other words, the control section 112 will instruct the line seizure means 128 to stop seizing the line and allow incoming calls to be routed to the telephone device 150, i.e., both double-pole, double-throw relays 75, 75a in second position. The process will return to step 700. If both the TIP and ring circuits are closed with respect to the telephone device 150, then the control section 112 will maintain the status and position of the relay. The process will return to step 700.

If the control section 112 determines that the predetermined criterion is the status of the security system 100, the control section 112 will first determine the status of the system, at step 840. Based upon this determination, the control section 112 will compare this status with a status-blocking list stored in memory If there is a match, i.e., user determined that for the current status, all calls should be blocked; the control section 112 will block all calls. Specifically, the control section 112 will determine the status of the TIP and ring circuits, i.e., position of both double-pole, double-throw relays 75, 75a, at step 850. If either of the TIP or ring circuit is open with respect to the telephone device, i.e., one of the double-pole, double-throw relays 75, 75a in first position, then the control section 112 maintains the status or position of the relay, i.e., do nothing. The process will return to step 700. If both of the TIP and ring circuits are closed, then the control section 112 will cause the line seizure means 128, e.g., at least one of the double-pole, double-throw relays 75, 75a to change its position to the first position, at step 855. In an embodiment of the invention, the control section can then disconnect and terminate the incoming call. The process will then return to step 700.

If the user did not intend for any calls to be blocked for the current status, i.e., no match in the status blocking list, then the control section 112 will not block the incoming telephone call.

The control section 112 will determine the status of the TIP and ring circuits, i.e., position of both double-pole, double-throw relays 75, 75a, at step 860. If either circuit is open with respect to the telephone device, then the control section 112 will cause the circuit to be closed, at step 865. The process will return to step 700. If both are closed, then the control section 112 will maintain the status, i.e., do nothing. The process will return to step 700.

In the above-identified embodiments, the telephone device 150 has been described as being a separate standalone device, however, it is within the scope of the invention to integrate the telephone device 150 within the security system 100. Additionally, the invention has been described with respect to a telephone line as the communication means, however, this description is only by way of example. The call blocking method and do not disturb mode, i.e., line seizure, can be implemented into any communication network where a signal can be redirected and routed. For example, the communication network can be a computer network. The telephone service can be provided by a cable company or other source using Voice-over-the-Internet Protocol (VOIP) technology. The control panel 110 would be connected to the communication network or incoming line in the same manner, but the connection would be to a cable modem or to another type of device used to facilitate communication.

In an alternate embodiment, even if the security system 100 has been programmed to block all calls for a specific period or all calls for a specific security system status or all calls in do not disturb mode, the control section can leave the TIP and ring circuits closed and only temporarily switch the relays when a call is incoming, during one of the above-identified conditions. This will allow a user to be able to access the telephone line to make an outgoing telephone call even if one of the above set conditions exists using the telephone device 150.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention, which is defined by the appended claims.

The invention claimed is:

1. A security system comprising:
a user device for inputting a first control signal to block an incoming telephone call, and for inputting a second control signal for controlling at least one feature of said security system;
at least one sensor of said security system that detects a person entering a protected area, said at least one sensor generates an alarm signal;
a control section for receiving said first and second control signals and for processing said first and second control signals, and for receiving said alarm signal from said at least one sensor, said control section generates a telephone line control signal based upon said first control signal; and
a line seizure means for opening or closing a connection between a incoming telephone line from a telephone company and a telephone device based upon the telephone line control signal received from the control section, wherein said security system maintains access to said incoming telephone line, even when said incoming telephone line is isolated from said telephone device, to allow for an emergency call to be placed.

2. The security system according to claim 1, wherein said first control signal includes at least one blocking criterion and at least one blocking parameter.

3. The security system according to claim 2, wherein said at least one blocking criterion is a predefined period of time.

4. The security system according to claim 3, wherein said line seizure means opens said connection from said incoming telephone line to said telephone device during said predefined period of time.

5. The security system according to claim 2, wherein said at least one blocking criterion is an identity of an incoming caller, and said blocking parameter is a caller identification.

6. The security system according to claim 5, wherein said control section includes a memory section for storing a pre-programmed list of caller identifications which is used to determine whether to block an incoming telephone call.

7. The security system according to claim 6, wherein said control section further includes a comparison means for comparing a caller identified that corresponding to said incoming telephone call, with said preprogrammed list and if said caller identification matches an caller identification from said preprogrammed list, said control section causes said line seizure means to open said connection from said incoming telephone line to said telephone device.

8. A method of blocking an incoming telephone call using a security system, the method comprising the steps of:
   (a) receiving a signal from a sensor of said security system that detects a person entering a protected area and that generates an alarm signal;
   (b) receiving said incoming telephone call;
   (c) generating at least one reception parameter based upon said received incoming telephone call;
   (d) detecting a blocking criterion in memory including at least a blocking criteria based upon receipt of an alarm signal from the sensor;
   (e) determining a type of said detected blocking criterion;
   (f) identifying a list of blocking parameters corresponding to said determined type of blocking criterion; and
   (g) blocking said incoming telephone call based upon a comparison of said at least one reception parameter and said identified list of blocking parameters.

9. The method according to claim 8, wherein said at least one reception parameter includes a time that said incoming telephone call is received.

10. The method according to claim 8, wherein step (g) includes the substeps of opening at least one connection from an incoming telephone line to a telephone device.

11. The method according to claim 8, wherein the method further includes the step of replaying a recorded outgoing message.

12. The method according to claim 8, wherein said predefined blocking criterion and said list of blocking parameters are programmed in advanced.

13. The method according to claim 8, wherein said predefined blocking criterion is a period of time and said list of blocking parameters includes a time schedule where all incoming telephone calls are blocked.

14. The method according to claim 8, wherein said predefined blocking criterion is a status of said security system and said list of blocking parameters includes a programmed list of at least one status for which all incoming telephone calls are blocked.

15. The method according to claim 8, wherein step (b) includes the substep of detecting a status of said security system when said incoming telephone call is received.

16. A method of blocking an incoming telephone call using a security system, the method comprising the steps of:
   (a) receiving signals from a sensor of said security system that detects a person entering a protected area and that generates an alarm signal;
   (b) depressing a predefined key on an user device;
   (c) transmitting a signal representing said key depression to a control device;
   (d) generating a control signal to block all incoming calls based upon said transmitted signal and based upon a received alarm signal from the sensor;
   (e) disconnecting a connection from a incoming telephone line to a telephone device based upon said control signal.

17. The method according to claim 16, wherein the method further includes the steps of: inputting a specific sleep period; and opening said connection from said incoming telephone line during said specific sleep period.

18. The security system according to claim 1, wherein said telephone device is a standalone telephone.

19. The security system according to claim 1, wherein said telephone device integrated into said security system.

20. The security system according to claim 1, wherein said line seizure means is at least one double-pole, double throw relay.

21. The security system according to claim 1, wherein said at least one double-pole, double throw relay has two switching positions, a first position that corresponds to an open connection to said telephone device and a second position that corresponds to a closed connection to said telephone device.

22. The security system according to claim 1, wherein said at least one double-pole double throw relay includes a first double-pole, double throw relay to control a ring and a second double-pole, double throw relay to control a TIP.

23. The security system according to claim 1, wherein said first double-pole, double throw relay is used to prevent said telephone device from producing an audible sound when said security system determines a incoming call is to be blocked.

24. The security system according to claim 1, wherein said user device is a wireless user operated transmitter.

25. The security system according to claim 1, wherein said security system further includes a recording means for recording an outgoing message to be played back when a incoming call is blocked, said outgoing message is stored in said memory; and a reproducing means for playing message said outgoing message, when said incoming call is blocked.

* * * * *